United States Patent [19]

Howard

[11] Patent Number: 5,192,046

[45] Date of Patent: Mar. 9, 1993

[54] PROCESSOR SUPPORT

[75] Inventor: Paul L. Howard, Belmont, Calif.

[73] Assignee: Steelcase Inc., Grand Rapids, Mich.

[21] Appl. No.: 706,656

[22] Filed: May 29, 1991

[51] Int. Cl.$^5$ ............................................. F16M 1/00
[52] U.S. Cl. ................................... 248/676; 248/172; 248/918
[58] Field of Search ............... 248/674, 676, 671, 678, 248/149, 172, 173, 346, 201, 918, 924

[56] References Cited

U.S. PATENT DOCUMENTS

| | | |
|---|---|---|
| 756,024 | 3/1904 | Jones . |
| 1,051,771 | 1/1913 | Smith et al. . |
| 1,117,412 | 11/1914 | Lynch . |
| 1,201,461 | 10/1916 | Hargrave . |
| 1,343,526 | 6/1920 | Smith ................ 248/173 X |
| 1,349,225 | 8/1920 | Rosenblum . |
| 1,401,171 | 12/1921 | Manny . |
| 1,715,722 | 6/1929 | Smith ................ 248/166 |
| 1,772,301 | 8/1930 | Barker . |
| 1,846,144 | 2/1932 | Risbridger ............ 248/173 X |
| 1,942,716 | 1/1934 | Lotter . |
| 2,763,302 | 9/1956 | English ................ 248/149 |
| 3,071,368 | 1/1963 | Harding . |
| 3,211,269 | 10/1965 | Emig . |
| 3,443,781 | 5/1969 | Wysowski ............ 248/173 X |
| 3,487,945 | 1/1970 | Barham . |
| 3,844,415 | 10/1974 | Heimann . |
| 4,084,455 | 4/1978 | Budrose . |
| 4,138,905 | 2/1979 | Konishi . |
| 4,458,874 | 7/1984 | Rabas et al. . |
| 4,685,846 | 8/1987 | Golay ................ 248/172 X |
| 4,854,803 | 8/1989 | Coccaro . |
| 4,874,099 | 10/1989 | Arnott et al. . |
| 4,949,934 | 8/1990 | Krenz ................ 248/918 |
| 5,040,766 | 8/1991 | Egly ................ 248/918 X |
| 5,080,320 | 1/1992 | Chieng ................ 248/676 |

FOREIGN PATENT DOCUMENTS 638186 5/1950 United Kingdom ............... 248/172

Primary Examiner—J. Franklin Foss
Attorney, Agent, or Firm—Price, Heneveld, Cooper, DeWitt & Litton

[57] ABSTRACT

A computer processor support or vertical stand is provided including a pair of opposed, coupled support members, each having a vertically extending end portion and a horizontally extending foot portion with an integral rack. A pawl member extends parallel to the foot portion and includes a hook. The pawl member is hingedly connected to the support member and includes an actuator which is actuatable to pivotally move the hook. A pair of the devices can be positioned in opposing relationship about a computer placed on edge so that the pair can be convergingly clamped onto the computer with the hook positively but releasably engaging the rack.

18 Claims, 5 Drawing Sheets

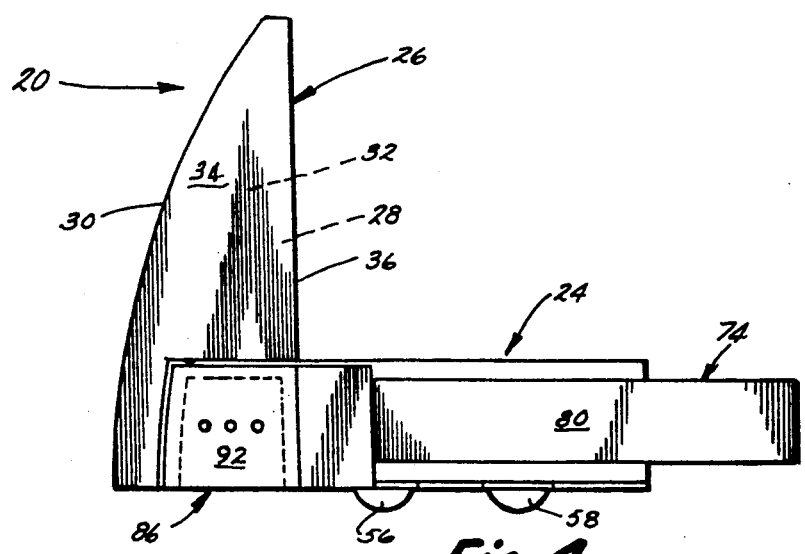
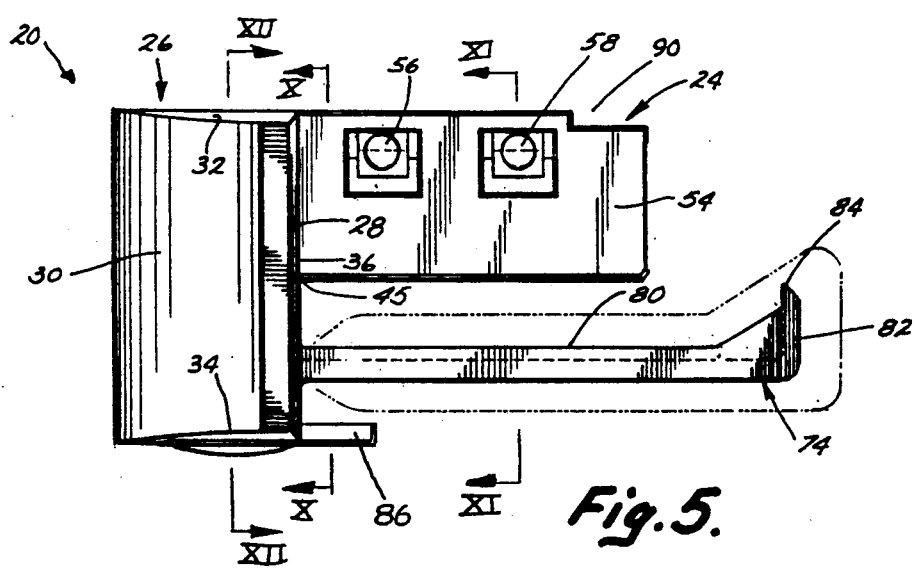
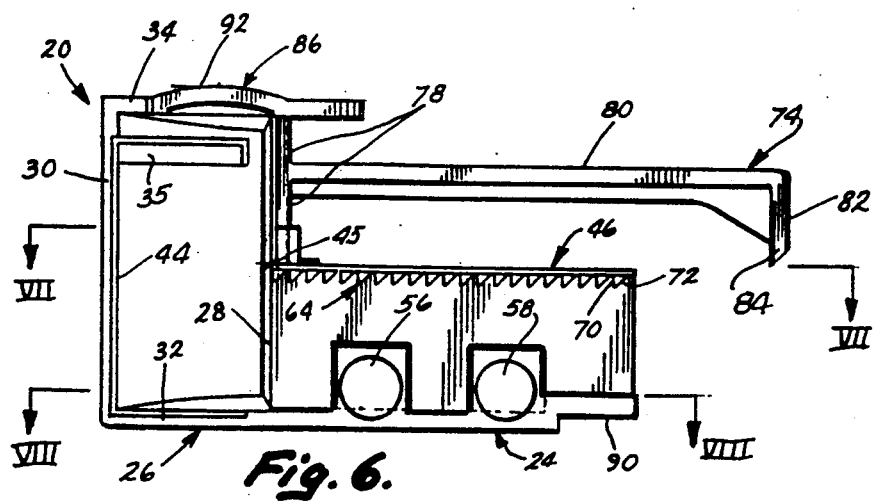

PROCESSOR SUPPORT

BACKGROUND OF THE INVENTION

This invention relates to computer accessory equipment and particularly to a holder for computer equipment.

Personal computers and related equipment have become common-place in today's modern office environment. Often the computer including monitor, central processing unit, keyboard and related equipment are placed on the user's desk where they are most accessible. However, this uses up valuable worksurface area which may be limited. Further, this clutters the desk reducing productivity. Thus, the problem of computer equipment placement is compounded.

One approach for preserving workspace has been to place the computer equipment on its edge adjacent the side of the desk or workstation or on the worksurface. However, this can place the equipment in a precarious position wherein it can easily be knocked over and damaged. Given the expense and time required for repair, the valuable data which could be lost and other disruption which could occur, such precarious placement is undesirable.

Various computer stands or supports have been proposed for holding a central processor unit vertically. The stands receive a side edge of the unit and have a foot pattern or sides which provide a reasonably stable support for the unit. The unit, when stood on its side, takes up less floor space or worksurface space. Prior proposals have suffered from aesthetic limitations and have not been adjustable or have limited adjustability. Prior adjustable holders used separate bolts and nuts to hold them together. Such separate parts could be lost and also created assembly difficulties.

Thus, an aesthetically pleasing holder is desired which is inexpensive, adjustable and securely holds the computer equipment in a stable, vertical position and is easy to use.

SUMMARY OF THE INVENTION

In accordance with the present invention, the aforementioned needs are fulfilled. Essentially, a device is provided which includes a pair of support members. Each member has a horizontally extending foot portion, a vertically extending end portion and an elongated rack joined to the foot portion. A pawl member includes a base hinged to the support member and an elongated leg joined to the base. The leg defines a tooth portion and the base includes an actuator. The support members are adjustably coupled by the rack and pawl member to receive the computer equipment. In narrower aspects, the pawl member positively locks on the elongated rack. The actuator pivotally releases the pawl member from the rack. One or more of the devices may be cooperatively clamped onto the computer equipment to releasably and securely hold it on edge in a vertical position.

DESCRIPTION OF THE DRAWINGS

FIG. 4 is a side view of a support member;

FIG. 5 is a top view of a support member;

FIG. 6 is a bottom view of a support member;

DETAILED DESCRIPTION OF THE PREFERRED EMBODIMENT

Figure 1:
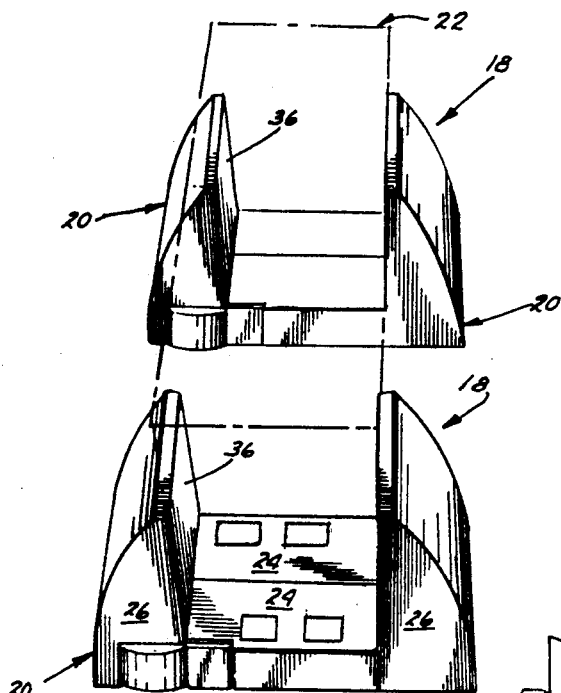
FIG. 1 is a perspective view of a system for supporting computer equipment including a pair of devices in accordance with the present invention.

A device or holder embodying the present invention is illustrated in the drawings and is generally designated by numeral 18. As shown in FIG. 1, a pair of holders 18 may be positioned to support computer equipment such as a computer processor unit 22 in a vertical position. The holders are moveable along an edge or side of unit 22 and provide a stable support. As described below, the holders are adjustable to accommodate different size units 22.

Figure 2:
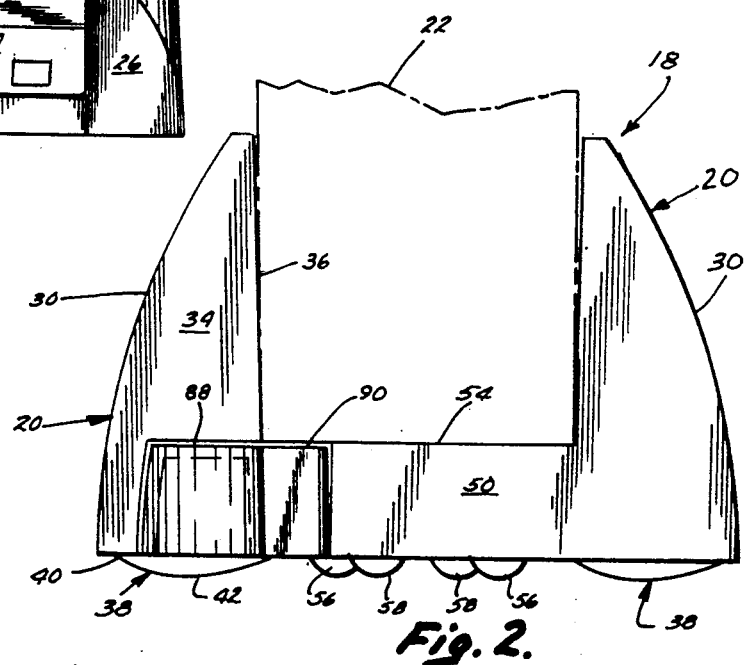
FIG. 2 is a side view of the system of FIG. 1.
Figure 3:
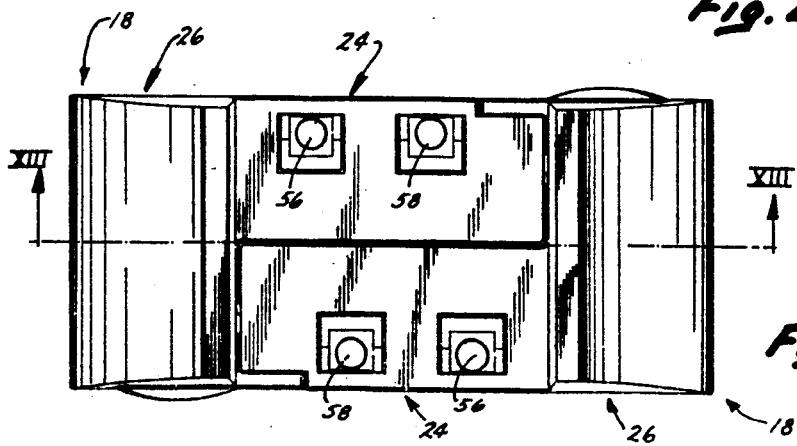
FIG. 3 is a top view of a device in accordance with the present invention.
Figure 7:
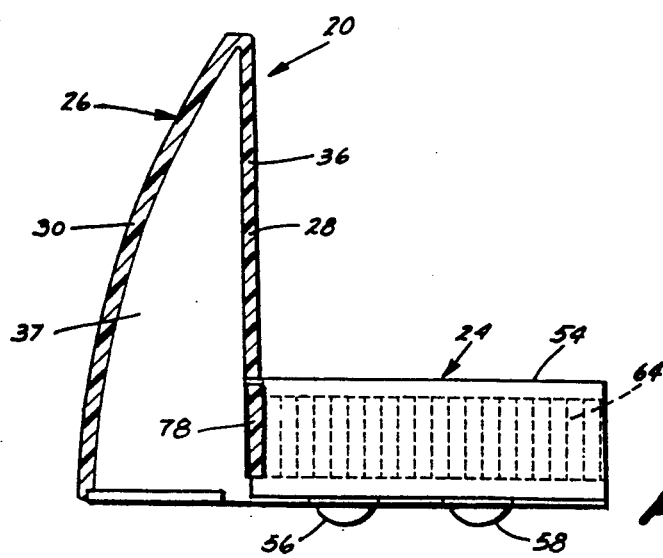
FIG. 7 is a cross-sectional view taken through line VII—VII in FIG. 6.
Figure 8:
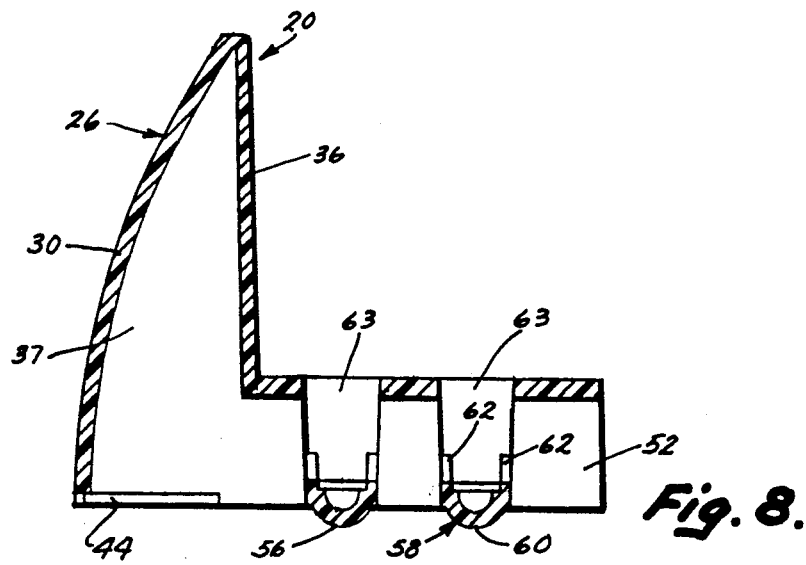
FIG. 8 is a cross-sectional view taken through line VIII—VIII in FIG. 6.
Figure 9:
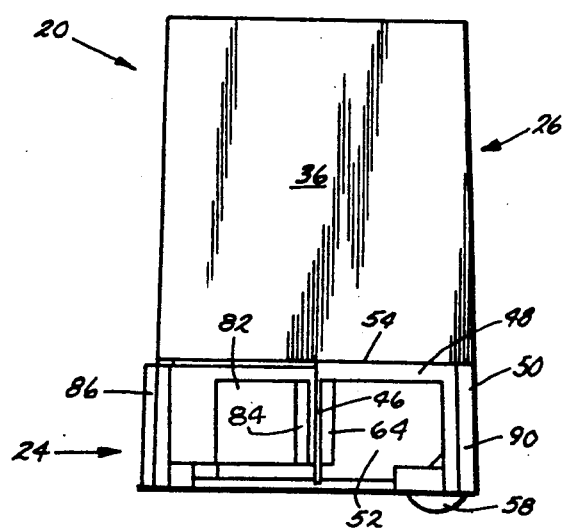
FIG. 9 is an end view of a support member as viewed from the right end in FIG. 4.
Figure 13:
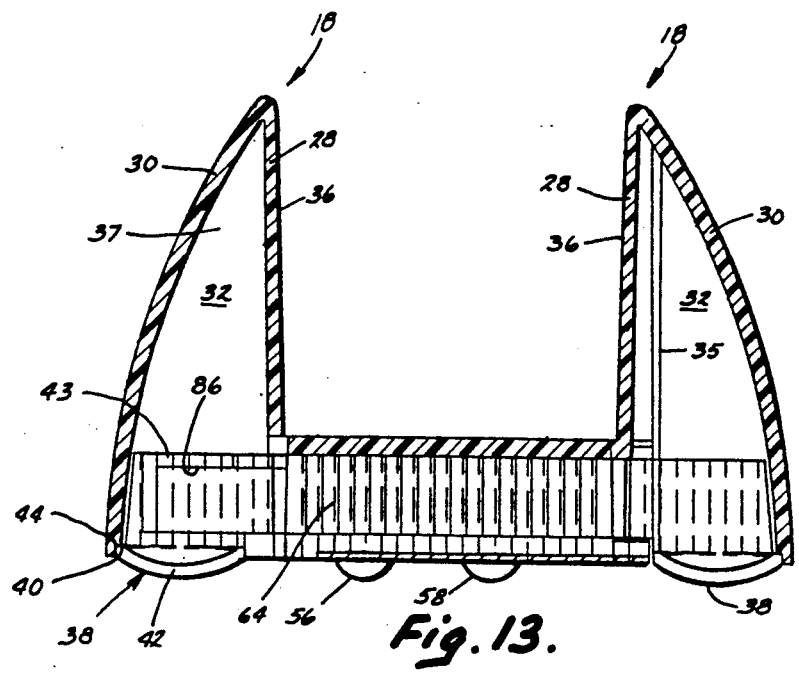
FIG. 13 is a cross-sectional view taken along the lines XIII—XIII in FIG. 3 showing a pair of opposing holders fully converged.
Figure 14:
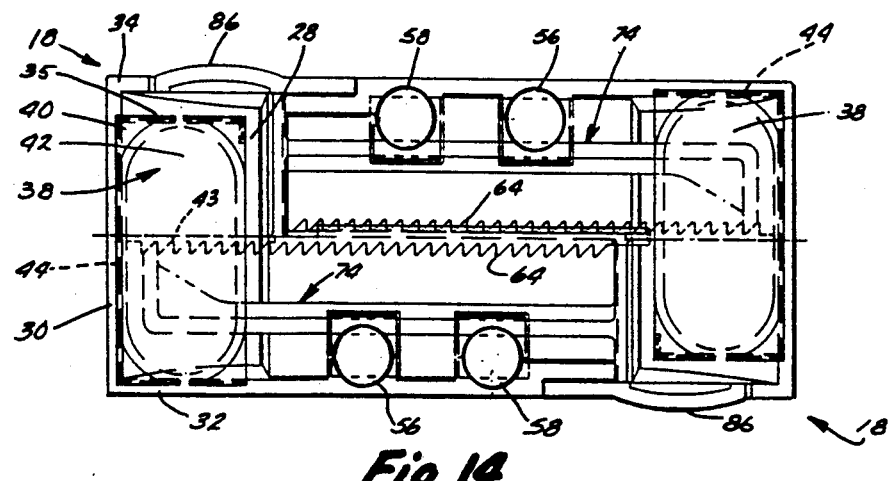
FIG. 14 is a bottom view showing a pair of opposing holders fully converged.

Each holder 18 includes a pair of support members 20. Each support member 20 (FIGS. 4-6) includes a horizontally extending foot portion 24 and a vertically extending end portion 26. End portion 26 includes a planar vertical inner wall 28 and arcuate outer wall 30 joined by side walls 32 and 34. Inner wall 28 (FIGS. 7 and 8) defines an inner surface 36 which engages computer processor unit 22 and joins with outer wall 30 and side walls 32, 34 to form a hollow compartment 37 which is moldable by conventional methods. A parallel inner wall 35 extends vertically, substantially parallel and inside of wall 34. A shaped insert 38 (FIGS. 2, 13 and 14) with a substantially planar lateral edge 40 and shaped contact portion 42 is attached to bottom facing ledge 44 defined by the lower edges of walls 28, 30, 32 and 35. Shaped insert 38 (FIG. 14) also includes an upstanding rack extending portion 43 which extends upwardly into hollow compartment 37 and aligns with an elongated rack 64, the purpose of which is described below. Shaped insert 38 can be held in place by a number of different methods such as by gluing or sonic welding. Shaped contact portion 42 extends downwardly a distance providing anti-tipping support for holder 20 on a support surface such as a floor or desk top. Insert 38 also closes off the bottom of vertically extending end portion 26 to create a more aesthetically appealing part.

Figure 10:
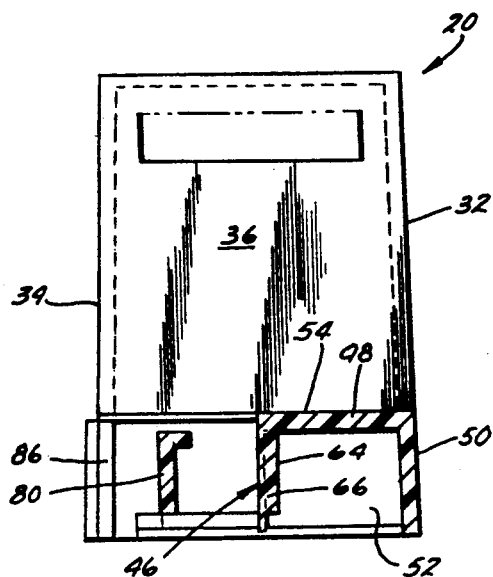
FIG. 10 is a cross-sectional view taken through line X—X in FIG. 5.
Figure 11:
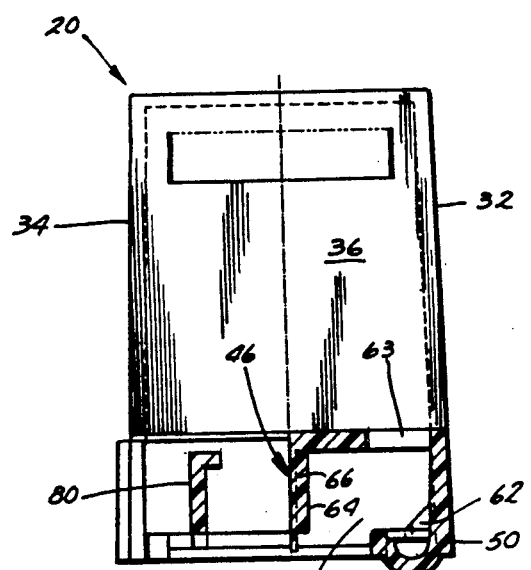
FIG. 11 is a cross-sectional view taken through line XI—XI in FIG. 5.
Figure 12:
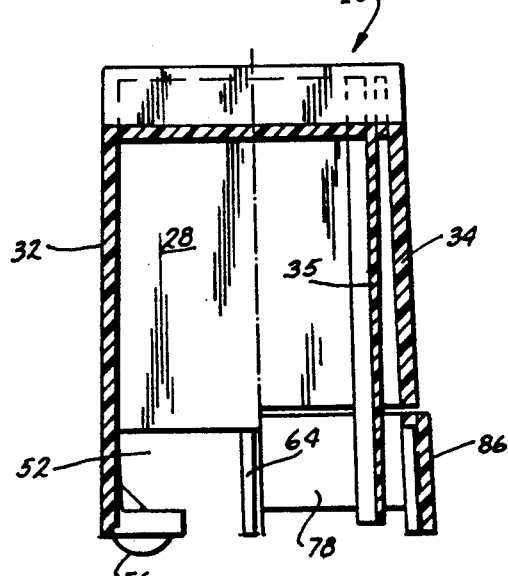
FIG. 12 is a cross-sectional view taken through line XII—XII in FIG. 5.

Foot portion 24 (FIGS. 4-6) integrally attaches near the lower end of vertical inner wall 28 at joint 45 (FIG. 6) and extends laterally therefrom. Foot portion 24 (FIG. 10) includes an inner wall 46, upper wall 48 and outer wall 50 which define an inverted U-shape and an opening 52 on the outer end thereof. An upper support surface 54 on upper wall 48 provides support for computer processor unit 22. Two integral intermediate support blisters 56 and 58 (FIG. 8 and 11) are positioned in spaced relationship laterally on foot portion 24 and extend inwardly from and integrally attach to outer wall 50. Blisters 56, 58 each include an arcuate contact portion 60 and support ribs 62. Square access openings 63 in upper wall 48 permit blisters 56, 68 to be molded integrally into foot portion 24 of holder 20 by conventional molding methods. Contact portion 60 of blisters 56, 58 on foot portion 24 horizontally aligns with contact portion 42 of insert 38 to provide for stable support of computer processor 22 on a support surface such as a floor.

An elongated rack 64 (FIG. 6) is integrally molded into the inside surface 66 of inner wall 46. Rack 64 (and also rack extending portion 43) includes multiple teeth 68, each with a first tooth side 70 which is substantially perpendicular to inner wall 46 and a second tooth side 72 which is inclined. First tooth side 70 is located on the side of a tooth 68 nearest arcuate outer wall 30 and shaped for positive engagement. Second tooth side 72 is inclined such that a corresponding member will slideably pass over side 72 as opposing support members 20 are converged, as discussed below.

Support member 20 further includes a pawl member 74 (FIGS. 5 and 6) which is integrally attached to inner wall 46 of foot portion 24 directly below planar inner wall 28 of vertical end portion 26 at joint 45. Pawl member 74 includes a base 78 which extends from inner wall 46 to a position directly below side wall 34. An elongated leg 80 extends perpendicularly about midway on base 78 parallel to foot portion 24. Elongated leg 80 (FIG. 11) has an L-shaped cross-sectional shape for stability. Leg 80 (FIGS. 5 and 6) ends with a tooth portion 82 on its outer extremity. Tooth portion 82 extends perpendicularly to the length of leg 80 and laterally inwardly toward rack 64. Tooth portion 82 includes a tip 84 which is adapted to mateably, positively engage teeth 68 of rack 64.

Figure 15:
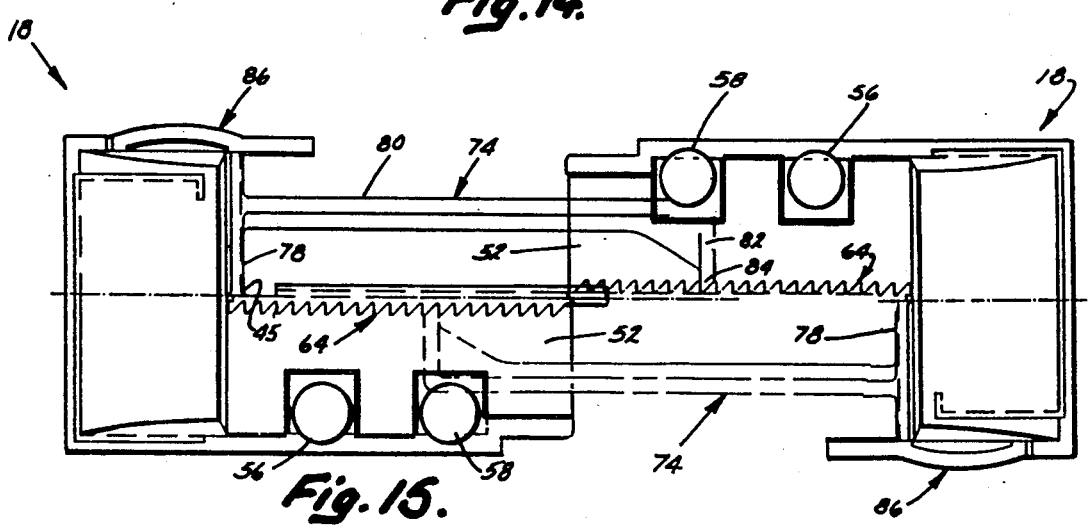
FIG. 15 is a bottom view showing a pair of opposing holder partially converged but with the shaped inserts removed.

On the outer end of base 78 is an actuator 86. Actuator 86 (FIG. 2) lies perpendicular to base 78 and is aligned below side wall 34 in a notch 88 in side wall 34 and further, when coupled to an opposing device 20 (FIGS. 14 and 15), is aligned with outer wall 50 of foot portion 24 in a notch 90. Actuator 86 provides a thumb button 92 which can be pressed to activate base 78. Base 78 forms a resiliently deformable living hinge generally on segment 94 which is located between leg 80 and outer wall 50 of foot portion 24 on base 78. By pushing on thumb button 92, base 78 resiliently elastically deforms causing tooth tip 84 on leg 80 to move away from rack 64.

A pair of support members 20 are positioned in opposed relationship and coupled to form holder 18. Opening 52 (FIG. 11) and, more particularly, walls 46, 48 and 50 and blisters 56, 58 are sized to matingly receive tooth portion 82 and elongated leg 80. Correspondingly, leg 80 is sized to slideably engage walls 46, 48 50 and the top of blisters 56, 58 so that the two support members 20 are guided into each other in a nonbinding manner with tooth tip 84 engaging on teeth 68 of rack 64. Support members 20 convergingly slide toward each other with tooth tip 84 slipping over teeth 68 until inner surface 36 clamps against computer processor 22. The two opposing support members 20 are at that point laterally, positively locked against support computer processor unit 22 and thus prevent tipping of computer processor 22 due to the shape of teeth 68 and tooth tip 84 which positively engage each other to prevent divergence of holders 18. For narrower computer equipment, rack extension portion 43 aligns with rack 64 and provides additional teeth for engaging tooth tip 84 so that opposed end portions 26 of member 20 can be positioned more closely towards each other until foot portions 24 engage opposite end portions 26.

Having described holder 18 and the features therein, the operation and also advantages of holder 18 should be apparent to one skilled in the art. Briefly, support member 20 without insert 38 is integrally molded in a simple two-piece mold from a suitable material such as ABS. Insert 38 is subsequently attached to the bottom thereof. It is contemplated that support member 20 and shaped insert 38 can be made of a variety of different materials and need not be molded or formed in a single operation, and also can be finished as desired.

Two support members 20 are then placed in opposing relationship on a support surface such as a desk top with foot portion 24 and elongated legs 80 facing inwardly toward each other in alignment. The two members 20 are then converged a distance toward each other such that leg 80 enters opening 52 and tooth tip 84 lockingly engages teeth 68 in rack 64 or rack extension 43. A computer processor unit 22 or the like is then placed on edge on support surface 54 and between inner surfaces 36. The two members 20 are then converged until computer processor unit 22 is securely held in an upright position.

To remove computer processor unit 22, the operator places a thumb on thumb button 92 and squeezes. This causes leg 80 to pivot tooth portion 82 away from rack 64 thereby releasingly disengaging tooth tip 84 from rack teeth 68. This is conveniently done by placing one's fingers and thumb opposingly on side 32 and thumb button 92 (adjacent side 34) and squeezing. The two members 20 can then be divergingly separated.

A holder may be sized so that a single holder can be used to support unit 22 or a pair of holders may be used a shown in FIG. 1. The holder is easily manufactured and assembled. The holder has no parts which can become separated and lost as with prior supports. The holder provides a stable yet aesthetically pleasing support.

In the foregoing description, it will be readily appreciated by those skilled in the art that modifications may be made to the invention without departing form the concept disclosed herein. Such modifications are to be considered as included in the following claims, unless these claims by their language expressly state otherwise.

The embodiments of the invention in which an exclusive property or privilege is claimed are defined as follows:

1. A device for use in supporting computer equipment in a vertical position, said device comprising:
   a support member defining a horizontally extending foot portion and a vertically extending end portion;
   an elongated rack joined to said foot portion; and
   a pawl member including a base hinged to said support member and an elongated leg joined to said base, said leg defining a tooth portion and said base including an actuator, and wherein said foot portion includes an upper support surface, an outer wall and an inner wall defining an opening at an end of said foot portion, said rack being formed as part of said inner wall.

2. A device as defined by claim 1 wherein said rack faces an inner surface of said outer wall and said leg of said pawl member extends spaced from and generally parallel to an outer surface of said inner wall with said base extending generally perpendicular to said leg.

3. A device as defined by claim 2 wherein said rack and said pawl member are integral with said foot portion and said end portion.

4. A system for supporting computer equipment including at least a pair of the devices as defined in claim 3 comprising:
   first and second support members positioned in opposing relationship; and
   said opening in said foot portion of said first support member adapted to receive said pawl member of said second member so as to allow said tooth portion on said pawl member of said second support member to positively engage said elongated rack on said foot portion of said first support member when said first and second support members are convergingly joined as positioned in said opposing relationship.

5. A system as defined by claim 4 wherein said first and second support members are identical in shape.

6. A system as defined by claim 5 wherein said foot portions and said pawl members act to align and guide said first and second support members as they are converged.

7. A device for use in supporting computer equipment in a vertical position, said device comprising:
   first and second support members positioned in opposing relationship, each member defining a horizontally extending foot portion and a vertically extending end portion, an elongated rack joined to said foot portion, a pawl member including a base hinged to said support member and an elongated leg joined to said base, said leg defining a tooth portion and said base including an actuator, and
   an opening in said foot portion of said first support member adapted to receive said pawl member of said second member so as to allow said tooth portion on said pawl member of said second support member to positively engage said elongated rack on said foot portion of said first support member when said first and second support members are convergingly joined as positioned in said opposing relationship.

8. A system as defined by claim 7 wherein said first and second support members are identical in shape.

9. An adjustable support member for securely supporting computer equipment in a vertical position comprising:
   a pair of opposing support members, each including a horizontally extending foot portion adapted to support the weight of computer equipment and further including a vertically extending end portion adapted to clampingly close on the computer equipment to prevent the computer equipment from accidentally tipping;
   guide means associated with at least one of said support members and cooperating with said foot portion of the other of said opposing support members to guide said pair of opposing support members between an open position for receiving the computer equipment and a closed position for vertically holding the computer equipment;
   locking means located on at least one of said support members hingedly connected to same and cooperating with said foot portion of the other of said opposing support members for positively locking said pair of opposing support members in said closed position; and
   releasing means integrally connected with said support members for releasing said positive locking means from said foot portions.

10. The support member as defined by claim 9 wherein said locking means includes a pawl member hingedly connected to each of said support members, said pawl member including an elongated leg with a tooth portion on one end.

11. The support member as defined by claim 10 wherein said elongated leg of said one support member cooperates with said foot portion of the other of said support members to form said guide means.

12. The support member as defined by claim 11 wherein said releasing means includes an actuator pivotally positioned on at least one of said support members and actuatable to release said locking means from engagement with said foot portion.

13. The support member as defined by claim 11 wherein said foot portion includes an upper support surface, an outer wall and an inner wall defining an opening at an end of said foot portion, and said locking means further includes an elongated rack formed as part of said inner surface of said outer and said pawl member extends spaced from and generally parallel to an outer surface of said inner wall.

14. The support member as defined by claim 12 wherein said opening in said foot portion of said first support member is adapted to receive said pawl member of said second member so as to allow said tooth portion on said pawl member of said second support member to positively engage said elongated rack on said foot portion of said first support member when said first and second support members are convergingly joined as positioned in said opposing relationship.

15. A system as defined by claim 14 wherein said first and second support members are identical in shape.

16. The support member as defined by claim 9 wherein said releasing means includes an actuator pivotally positioned on at least one of said support members and actuatable to release said locking means from engagement with said foot portion.

17. The support member as defined by claim 9 wherein said foot portion includes an upper support surface, an outer wall and an inner wall defining an opening at an end of said foot portion, and said locking means further includes an elongated rack formed as part of said inner surface of said outer and said pawl member extends spaced from and generally parallel to an outer surface of said inner wall.

18. A system as defined by claim 9 wherein said first and second support members are identical in shape.

* * * * *